US011258999B2

(12) United States Patent
Rao Padebettu et al.

(10) Patent No.: US 11,258,999 B2
(45) Date of Patent: Feb. 22, 2022

(54) METHOD AND DEVICE FOR REDUCING MOTION SICKNESS WHEN PROVIDING 360-DEGREE VIDEO

(71) Applicant: SAMSUNG ELECTRONICS CO., LTD., Suwon-si (KR)

(72) Inventors: Rohit Rao Padebettu, Bengaluru (IN); Nachiketa Das, Bengaluru (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 15/983,550

(22) Filed: May 18, 2018

(65) Prior Publication Data

US 2018/0338132 A1 Nov. 22, 2018

(30) Foreign Application Priority Data

May 18, 2017 (IN) .............................. 201741017479
May 9, 2018 (IN) .............................. 201741017479

(51) Int. Cl.
*H04N 13/122* (2018.01)
*G06T 7/20* (2017.01)
*H04N 13/178* (2018.01)
*G06T 7/70* (2017.01)
*H04N 5/232* (2006.01)
(Continued)

(52) U.S. Cl.
CPC ............ *H04N 13/122* (2018.05); *G06T 7/20* (2013.01); *G06T 7/70* (2017.01); *H04N 13/178* (2018.05); *H04N 13/344* (2018.05); *H04N 19/00* (2013.01); *H04N 19/46* (2014.11); *G06T 2207/30244* (2013.01); *H04N 5/23238* (2013.01);
(Continued)

(58) Field of Classification Search
None
See application file for complete search history.

(56) References Cited

U.S. PATENT DOCUMENTS 6,497,649 B2   12/2002   Parker et al.
9,645,395 B2   5/2017    Bolas et al.
(Continued)

FOREIGN PATENT DOCUMENTS

EP   3 177 010 A1    6/2017
WO   2014/100484 A1  6/2014
(Continued)

OTHER PUBLICATIONS

Dizio, et al., "Circumventing Side Effects of Immersive Virtual Environments", Ashton Graybiel Spatial Orientation Laboratory and Volen Center for Complex Systems, Brandeis University, pp. 893-896.
(Continued)

*Primary Examiner* — Mohammed Jebari
(74) *Attorney, Agent, or Firm* — Sughrue Mion, PLLC

(57) ABSTRACT

A method reducing a motion sickness effect associated with a rendering of a video on a virtual reality device includes: extracting, from a portion of the video, at least one motion parameter that relates to a motion of a camera used for capturing the video, determining, based on the extracted at least one motion parameter, at least one motion sickness reduction scheme to be applied to the video, and dynamically rendering the video to the virtual reality device by applying the determined motion sickness scheme to the portion of the video.

11 Claims, 9 Drawing Sheets

(51) Int. Cl.
*H04N 13/344* (2018.01)
*H04N 19/46* (2014.01)
*H04N 19/00* (2014.01)
H04N 19/597 (2014.01)

(52) U.S. Cl.
CPC ..... *H04N 5/23254* (2013.01); *H04N 5/23258* (2013.01); *H04N 19/597* (2014.11)

(56) References Cited

U.S. PATENT DOCUMENTS

| | | |
|---|---|---|
| 2002/0099257 A1 | 7/2002 | Parker et al. |
| 2003/0073922 A1* | 4/2003 | Miller ............... H04N 1/00 600/545 |
| 2004/0105573 A1 | 6/2004 | Neumann et al. |
| 2006/0015000 A1* | 1/2006 | Kim ............... A61M 21/00 600/27 |
| 2009/0092311 A1* | 4/2009 | Kim ............... G06T 7/85 382/154 |
| 2010/0141555 A1* | 6/2010 | Rorberg ............ G02B 27/017 345/8 |
| 2011/0294544 A1* | 12/2011 | Liang ............ H04N 21/2353 455/556.1 |
| 2012/0062444 A1* | 3/2012 | Cok ............... G02B 27/0172 345/8 |
| 2012/0182206 A1* | 7/2012 | Cok ............... G02B 27/017 345/8 |
| 2014/0152792 A1* | 6/2014 | Krueger ............ A61M 21/00 348/78 |
| 2014/0176296 A1 | 6/2014 | Morgan |
| 2014/0268356 A1* | 9/2014 | Bolas ............... G02B 27/0093 359/630 |
| 2015/0097863 A1* | 4/2015 | Alaniz ............. G06T 19/006 345/633 |
| 2016/0167672 A1* | 6/2016 | Krueger ............ H04N 13/366 340/576 |
| 2016/0246061 A1 | 8/2016 | Bickerstaff et al. |
| 2016/0267720 A1 | 9/2016 | Mandella et al. |
| 2016/0337630 A1 | 11/2016 | Raghoebardajal et al. |
| 2017/0142337 A1* | 5/2017 | Kokaram ........... H04N 5/23238 |
| 2018/0032230 A1* | 2/2018 | Inomata ............. H04N 13/344 |
| 2018/0077409 A1* | 3/2018 | Heo ................. H04N 13/122 |
| 2018/0176483 A1* | 6/2018 | Knorr ............... H04N 5/23222 |
| 2018/0181196 A1* | 6/2018 | Lee ................. H04N 5/23296 |
| 2018/0234669 A1* | 8/2018 | Chen ................ H04N 5/23238 |
| 2018/0261003 A1* | 9/2018 | Peli ................. G06T 15/08 |
| 2019/0172410 A1* | 6/2019 | Okumura ........... G06F 3/0346 |
| 2019/0244369 A1 | 8/2019 | Lim et al. |

FOREIGN PATENT DOCUMENTS

| | | |
|---|---|---|
| WO | 2016/017245 A1 | 2/2016 |
| WO | 2018/008991 A1 | 1/2018 |

OTHER PUBLICATIONS

Anonymous, "Motion Sickness—Why Does It Happen in 360° VR Films?", 2017, SpeedVR, 3 pages total, http://speedvr.co.uk/360-vr-filmmaking/motion-sickness-why-does-it-happen-in-360-vr-films/.

Fernandes, et al., "Combating VR Sickness through Subtle Dynamic Field-Of-View Modification", 2016, IEEE Symposium on 3D User Interfaces, pp. 201-210.

Anonymous, "Spherical Video V2 RFC (draft)", 2017, Spatial-Media, 10 pages total, https://github.com/google/spatial-media/blob/master/docs/spherical-video-v2-rfc.md.

Fernandes et al. "Combating VR Sickness through Subtle Dynamic Field-Of-View Modification", Mar. 20, 2016, IEEE Symposium on 3D User Interfaces, pp. 201-210 (16 pages total).

International Search Report (PCT/ISA/210) dated Oct. 12, 2018 issued by the International Searching Authority in International Application No. PCT/KR2018/005705.

Written Opinion (PCT/ISA/237) dated Oct. 12, 2018 issued by the International Searching Authority in International Application No. PCT/KR2018/005705.

Communication dated May 28, 2020 issued by the European Patent Office in counterpart European Application No. 18802463.2.

Communication dated May 27, 2020 issued by the Intellectual Property Office of India in Indian Patent Application No. 201741017479.

Communication dated Jan. 13, 2021 issued by the European Patent Office in European Application No. 18 802 463.2.

* cited by examiner

METHOD AND DEVICE FOR REDUCING MOTION SICKNESS WHEN PROVIDING 360-DEGREE VIDEO

CROSS-REFERENCE TO RELATED APPLICATION(S)

This application is based on and claims priority under 35 U.S.C. § 119 from Indian Application No. 201741017479, filed on May 18, 2017, in the Indian Intellectual Property Office, and Indian Application No. 201741017479, filed on May 9, 2018, in the Indian Intellectual Property Office, the disclosures of which are incorporated by reference herein in their entireties.

BACKGROUND

Field

The disclosure relates to a method and a device for providing 360-degree video using virtual reality (VR).

Description of the Related Art

Virtual reality (VR) refers to a computer-simulated environment that may simulate a user's physical presence in real or imaginary environments. Although VR systems may provide a realistic and immersive experience, they also cause motion sickness in many users. The motion sickness typically occurs as the motion is perceived visually in VR, but the body is physically at rest. Further, the motion sickness in VR may cause various sensations such as nausea, dizziness, headache, sweating, and other sensations.

Due to motion sickness induced by moving 360-degree videos, the users are unable to enjoy 360-degree content for extended periods of time. In order to reduce the motion sickness, various schemes (e.g., reducing a Field Of View (FOV) during camera translation, stroboscopic illumination at 8 Hz during camera translation, static point of reference during camera rotation, or the like) have been developed.

In some instances, due to high relative velocity, peripheral vision causes the motion sickness. During such instances, reducing the FOV may reduce the motion sickness by restricting the peripheral vision. A retinal slip occurs when the retina in the eye is unable to register the object due to high velocity. With the technique of stroboscopic illumination, a strobe (i.e., empty frames) is added at 8 Hz, which reduces motion sickness due to the retinal slip. With usage of static point of reference, the user's attention is drawn to a static marker during rotation of a scene.

However, the above-described schemes hamper immersion of a VR scene. Further, these schemes have not been selectively applied to address the various motion sickness scenarios encountered during a 360-degree video playback.

SUMMARY

Provided are a method and a device for providing 360-degree video using a Virtual Reality (VR).

In accordance with an aspect of the disclosure, motion parameters associated with a 360-degree camera for a plurality of frames are estimated while capturing the 360-degree video using sensor data.

In accordance with an aspect of the disclosure, it is determined whether the 360-degree camera is in relative motion across a subset of the plurality of video frames based on the determined motion parameters.

In accordance with an aspect of the disclosure, the motion parameters of the 360-degree camera are encoded as metadata on a subset of the plurality of the video frames when the 360-degree camera is in relative motion.

In accordance with an aspect of the disclosure, a type of motion of the camera across the plurality of frames is determined based on the estimated motion parameters.

In accordance with an aspect of the disclosure, one or more motion sickness reduction schemes for reducing an impact of the motion are selected while rendering the 360-degree video on the VR device.

In accordance with an aspect of the disclosure, the 360-degree video on the VR device is rendered by applying the one or more motion sickness reduction schemes.

In accordance with an aspect of the disclosure, a video playback for the 360-degree video is performed to reduce motion sickness in the 360-degree video by estimating the camera motion in real-time while rendering the 360-degree video.

In accordance with an aspect of the disclosure, features and depth information across a set of video frames of the 360-degree video are identified while rendering the 360-degree video.

In accordance with an aspect of the disclosure, the movement of each feature across the set of video frames is determined based on the identified features and depth information.

In accordance with an aspect of the disclosure, the 360-degree camera's motion parameters across the set of video frames is estimated based on determined feature movement.

In accordance with an aspect of the disclosure, an appropriate motion sickness correction technique is applied during playback of the set of the video frames based on the estimated motion parameters.

Additional aspects will be set forth in part in the description which follows and, in part, will be apparent from the description, or may be learned by practice of the presented embodiments.

In accordance with an aspect of the disclosure, a method reducing a motion sickness effect associated with a rendering of a video on a virtual reality device includes: extracting, from a portion of the video, at least one motion parameter that relates to a motion of a camera used for capturing the video, determining, based on the extracted at least one motion parameter, at least one motion sickness reduction scheme to be applied to the video, and dynamically rendering the video to the virtual reality device by applying the determined motion sickness scheme to the portion of the video.

In accordance with an aspect of the disclosure, a virtual reality device includes a display, and at least one processor, where the processor is configured to extract, from a portion of the video, at least one motion parameter that relates to a motion of a camera used for capturing the video, determine, based on the extracted at least one motion parameter, at least one motion sickness reduction scheme to be applied to the video, and dynamically render the video to the virtual reality device by applying the determined motion sickness scheme to the portion of the video.

The device includes a motion sensor, an image sensor, and a processor, wherein the processor is configured to obtain, from the motion sensor, data that relates to a plurality of frames of a 360-degree video which is sensed while the image sensor is capturing the 360-degree video, estimate at least one motion parameter that relates to the device based on the data obtained from the motion sensor, determine, based on the estimated at least one motion parameter, whether the device is moving, and in response to determining that the device is moving, encode the estimated at least one motion parameter in the 360-degree video.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
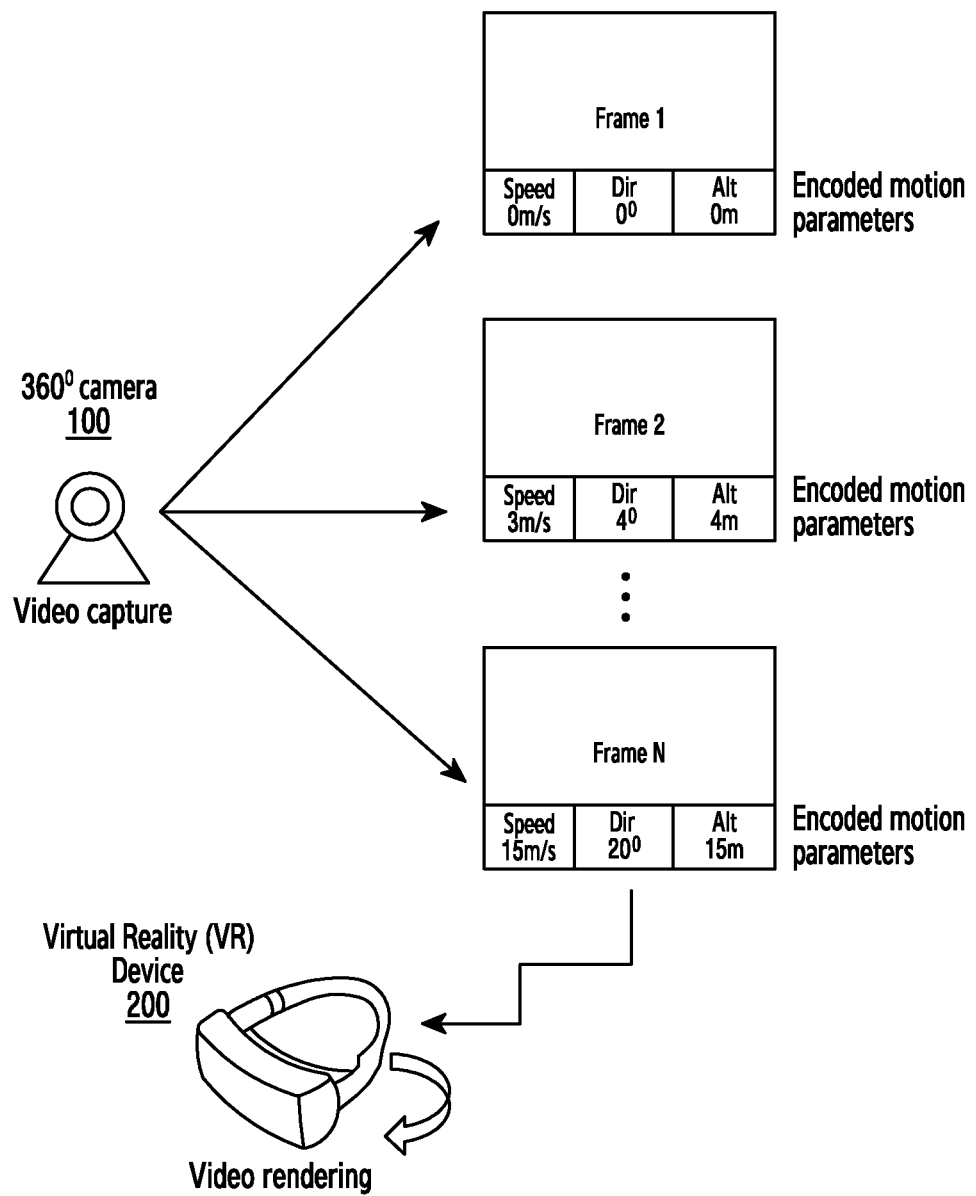
FIG. 1 illustrates a 360-degree camera for capturing a 360-degree video with encoded motion parameters, and a Virtual Reality (VR) device for rendering, according to an embodiment.

The embodiments disclosed herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments disclosed herein. Further, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments disclosed herein can be practiced and to further enable persons having ordinary in the art to practice the embodiments disclosed herein. Accordingly, the examples should not be construed as limiting the scope of the embodiments disclosed herein.

As used herein, expressions such as "at least one of" and "at least one from among," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

The embodiments disclosed herein achieve a method and system for rendering a 360-degree video on a Virtual Reality (VR) display. The method includes identifying one or more objects across a plurality of frames of the 360-degree video. The method includes estimating one or more motion parameters associated with a camera by tracking a motion of the one or more objects across the plurality of frames. The method includes determining a type of motion of the camera across the plurality of frames based on the estimated motion parameters. The method includes selecting one or more motion sickness reduction schemes based on the determined type of motion of the camera across the plurality of frames. Further, the method includes dynamically rendering the 360-degree video on the VR display by applying the one or more motion sickness reduction schemes across the plurality of frames based on the determined type of motion of the camera across the plurality of frames. It should be noted that the one or more motion sickness reduction schemes are applied on the plurality of frames based on the determined type of motion of the camera (i.e., translation of the camera, rotation of the camera or a combination of translation and rotation of the camera) across the plurality of frames.

The proposed method may be used to enhance the user experience by automatically applying motion sickness reduction techniques while rendering the 360 video.

For example, if the camera is undergoing a relatively slow translation in a particular frame, then dynamic Field of View (FOV) reduction is applied. In case of a faster translation, dynamic FOV reduction and stroboscopic illumination can be applied.

In various embodiments, the 360-degree video is captured by encoding the motion parameters in the 360-degree video. The 360-degree camera includes one or more of a plurality of sensors, such as an accelerometer, a gyroscope, an altimeter, and/or the like, for capturing the 360-degree video. The method includes obtaining data from a plurality of sensors of the 360-degree camera with respect to a plurality of frames of the video while capturing the video. The method includes estimating motion parameters associated with the 360-degree camera for the plurality of frames by using the data obtained from the plurality of sensors. For example, the motion parameters may include any of position coordinates, velocity, acceleration, altitude, angle of rotation, and/or direction of the 360-degree camera. The method includes determining whether the 360-degree camera is in relative motion across the plurality of frames based on the estimated motion parameters.

Further, the method includes dynamically encoding the motion parameters as metadata in the video when it is determined that the 360-degree camera is in relative motion. In some embodiments, the 360-degree video is encoded to video formats such as MP4 and WebM. However, in order to add information about 360-degree video, standard container formats such as Spherical Video V2 RFC are in the process of standardization.

In an embodiment, when the user captures the 360 video from a moving camera, metadata describing the camera motion is encoded in the video frames. During video playback, the metadata is used to determine the type of camera motion (e.g., translation or rotation), and an appropriate motion sickness reduction technique is then automatically applied in order to counteract the motion sickness effect caused by the motion. This may result in an improved viewing experience for the user.

In some embodiments, when the metadata is not encoded in the video frame, the metadata is computed in real time by applying feature tracking techniques on the plurality of frames while rendering the 360-degree video on the VR display.

In various embodiments, the motion parameters of the 360-degree video are pre-computed before rendering the 360-degree video on the VR display.

Referring now to the drawings, and more particularly to FIGS. 1 through 8, where similar reference characters denote corresponding features consistently throughout the figures, there are shown embodiments.

FIG. 1 illustrates a 360-degree camera 100 which is configured for capturing a 360-degree video with encoded motion parameters and a Virtual Reality (VR) device 200 which is configured for rendering the 360-degree video, according to an embodiment. The 360-degree camera 100 may implement any suitable 360° video-capture technology, e.g., multiple-lens direct capture, single-lens or multiple-lens compressed capture, and so on for capturing the 360-degree video (or a 360-degree still image).

In an embodiment, the 360-degree camera 100 may be an electronic device independent (or distinct) from the VR device 200 (e.g., VR headset, head mount display (HMD), etc.). In an embodiment, the 360-degree camera 100 may be included in the VR device 200.

In an embodiment, the 360-degree camera 100 includes a plurality of sensors, such as at least one from among an accelerometer, a gyroscope, a barometric sensor, and/or the like. The plurality of sensors in the 360-degree camera 100 track motion parameters associated with the 360-degree camera 100 while the 360-degree video is being captured.

The motion parameters associated with the 360-degree camera 100 include any one or more of position coordinates, velocity, acceleration, altitude, angle of rotation, and/or direction of the 360-degree camera 100. These motion parameters indicate movements of the 360-degree camera 100 while the 360-degree video is being captured. For example, the accelerometer measures the rate (or velocity) at which the camera has moved while capturing the 360-degree video. The gyroscope measures angular rotation (degrees) and direction of the 360-degree camera 100 while capturing 360 the video. The barometric sensor can be used to measure an altitude of the 360-degree camera 100 while capturing the 360-degree video. A Global Positioning System (GPS) sensor can be used to determine position coordinates of the 360-degree camera with respect to the video being captured.

As depicted in FIG. 1, when recording the 360-degree video, data (i.e., speed, angular rotation, and altitude) from the plurality of sensors is obtained for a plurality of frames (for example, N frames). With the data from the plurality of sensors, a change in velocity, angular rotation of the camera, and direction of the camera are computed by analyzing the plurality of frames.

For example, a first frame of the 360 video and a next ten frames of the 360 video may be acquired. With the data obtained from the sensors with respect to the first frame and the next ten frames, the motion parameters of the 360-degree camera 100 across the 10 frames may be computed by analyzing the frames with the data obtained from the sensors.

In an embodiment, it is determined whether the 360-degree camera 100 is in relative motion across the plurality of frames, based on the estimated motion parameters of the 360-degree camera 100 (i.e., whether the 360-degree camera has moved across the frames with the respect to the surrounding environment).

When it is determined that the 360-degree camera 100 is in relative motion, the motion parameters of the 360-degree camera 100 (i.e., speed, angular rotation, and/or altitude) are encoded (or inserted, or added) as metadata in each of the video frame(s) while capturing the 360-degree video, as shown in FIG. 1.

In an embodiment, while rendering the 360-degree video on the VR device 200, each frame of the 360-degree video is analyzed to determine (or detect) the presence of encoded metadata. In this case, when the video frame includes encoded metadata, one or more suitable motion sickness reduction schemes are selected for reducing an impact of the motion as indicated by the motion parameters of the 360-degree camera 100. Further, the video frame(s) is rendered by applying the one or more suitable motion sickness reduction schemes. It should be noted that the one or more motion sickness reduction schemes are applied over N frames having the encoded metadata for reducing the motion sickness while rendering the 360-degree video on the VR device 200 as shown in FIG. 1.

Thus, by implementing the proposed method, the motion parameters of the 360-degree camera 100 are encoded within the video frame(s) while capturing the 360 video for reducing the motion sickness when the 360-degree video is rendered on the VR display.

Figure 2A:
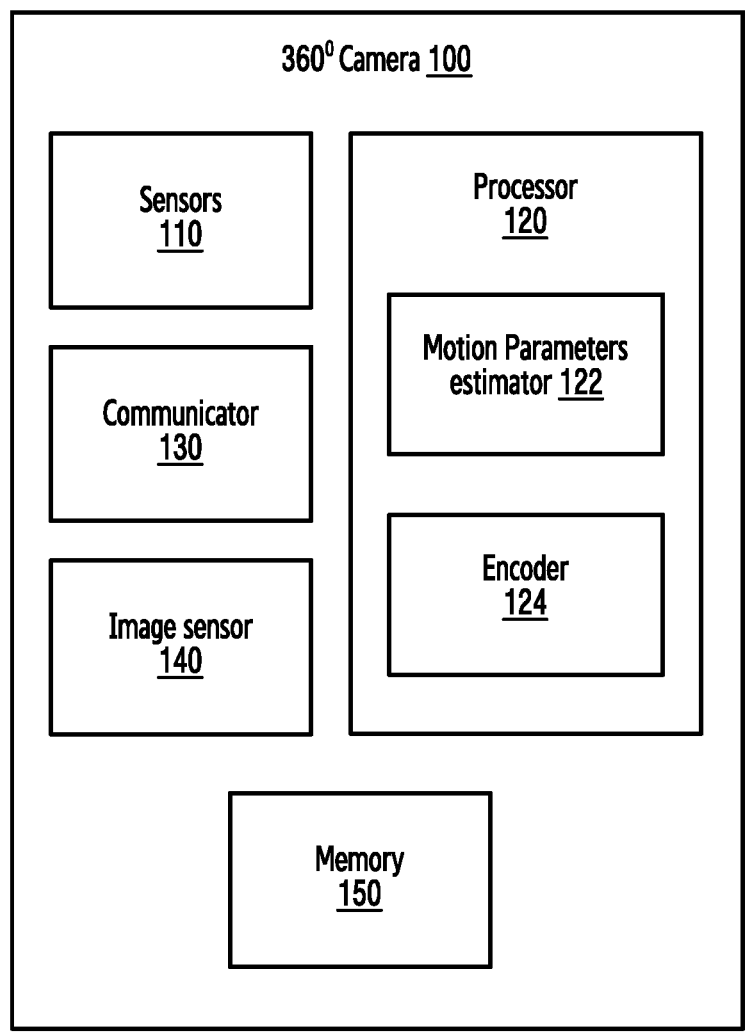
FIG. 2A illustrates various components of the 360-degree camera for capturing the 360-degree video with encoded motion parameters, according to an embodiment.

FIG. 2A illustrates various components of the 360-degree camera 100 for capturing the 360-degree video with encoded motion parameters, according to an embodiment. As depicted in FIG. 2A, the 360-degree camera 100 includes sensors 110, a processor 120, a communicator 130, an image sensor 140, and a memory 150. The processor 120 includes a motion parameters estimator 122 and an encoder 124. In an embodiment, the processor 120 may include a video capturing engine, and the video capturing engine may include the motion parameters estimator 122 and the encoder 124. In an embodiment, the video capturing engine, which includes the motion parameters estimator 122 and the encoder 124, may be implemented as a component that is independent from the processor 120.

The sensors 110 may include at least one from among the accelerometer, the gyroscope, the altimeter, the barometric sensor, inertial sensors, and/or the like for tracking (or detecting) the movements of the 360-degree camera 100 while the 360-degree video is being captured. The data obtained from the sensors is communicated to the processor 120 for encoding the motion parameters of the 360-degree camera as metadata in the video frame(s).

In an embodiment, the motion parameters estimator 122 may be configured to estimate motion parameters of the 360-degree camera 100 (i.e., speed, angular rotation, and altitude) across the video frames by analyzing the video frames based on the data obtained from the sensors 110.

In an embodiment, motion parameters estimator 122 may be configured to determine whether the 360-degree camera 100 is in relative motion across the plurality of frames based on the estimated motion parameters of the 360-degree camera 100. Further, motion parameters estimator 122 may be configured to provide an indication to the encoder 124 when the 360-degree camera 100 is in relative motion across the plurality of frames.

The encoder 124 may be configured to encode the motion parameters of the 360-degree camera 100 (i.e., speed, angular rotation, and altitude) as metadata in the video frame(s) while the 360-degree video is being captured. The proposed method may include encoding camera motion as metadata which can be added (or inserted) to an existing header such as Spherical video header (svhd) or MeshBox header (Mesh).

The processor(s) 120 execute instructions that may be loaded into a memory 150. The processor(s) 120 may include any suitable number(s) and type(s) of processors or other devices in any suitable arrangement. Example types of processor(s) 120 include microprocessors, microcontrollers, digital signal processors, field programmable gate arrays, application specific integrated circuits (i.e., ASICs), and discrete circuitry. In an embodiment, the processor 120 may include an image signal processor.

The communicator 130 may be configured to communicate the captured 360-degree video to one or more electronic devices, servers, VR devices, or the like for processing and/or rendering the 360-degree video. For example, the communicator 130 may include a network interface card and/or a wireless transceiver configured for facilitating communications over a network. The communicator unit 130 may support communications via any suitable physical or wireless communication link(s).

The image sensor 140 captures the 360-degree video from multiple view ports. The image sensor 140 may implement any suitable 360° video-capture technology, e.g., multiple-lens direct capture, single-lens or multiple-lens compressed capture, and so on for capturing the 360-degree video.

The memory 150 may include non-volatile storage elements. Examples of such non-volatile storage elements may include magnetic hard discs, optical discs, floppy discs, flash memories, and/or forms of electrically programmable memories (EPROM) or electrically erasable and programmable (EEPROM) memories. In addition, the memory 150 may, in some examples, be considered a non-transitory storage medium. The term "non-transitory" may indicate that the storage medium is not embodied in a carrier wave or a propagated signal. However, the term "non-transitory" should not be interpreted that the memory 150 is non-movable. In some examples, the memory 150 may be configured to store larger amounts of information than the memory. In certain examples, a non-transitory storage medium may store data that may, over time, change (e.g., in Random Access Memory (RAM) or cache).

Figure 2B:
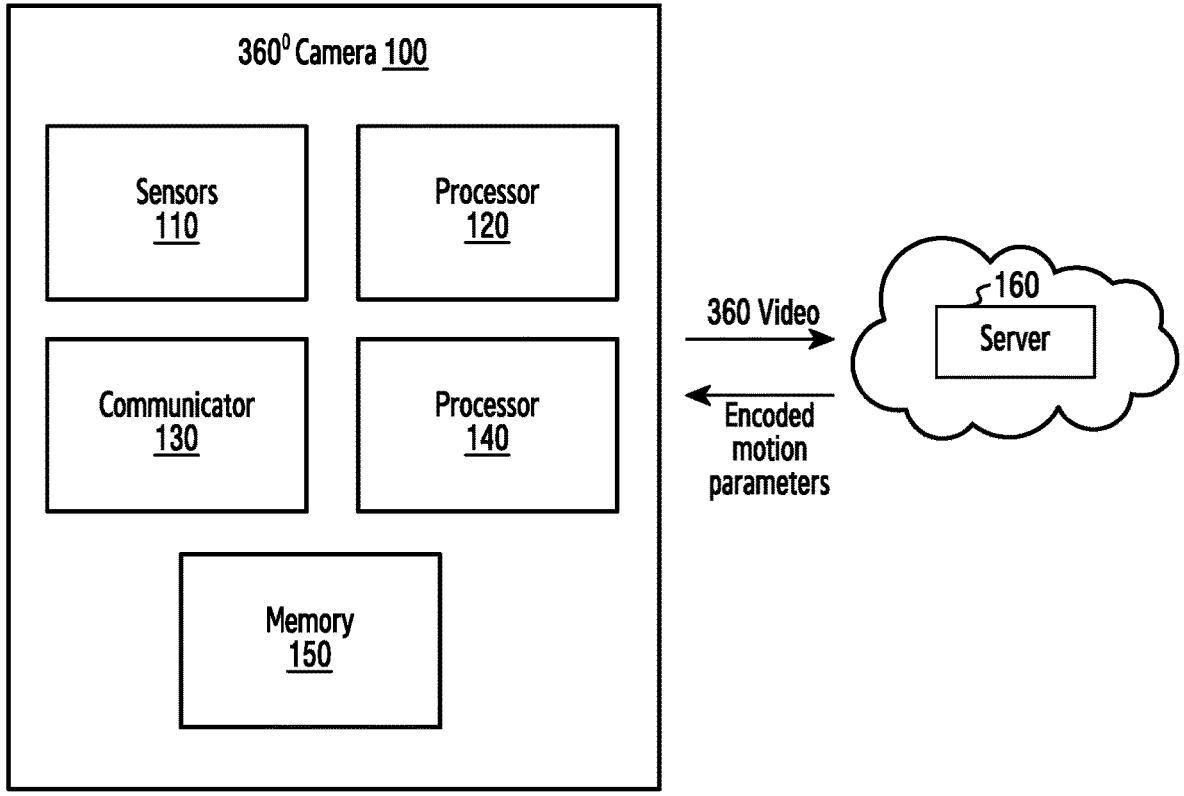
FIG. 2B is an example illustration in which the 360-degree camera receives the 360 video with encoded motion parameters from a server, according to an embodiment.

FIG. 2B is an example illustration in which the 360-degree camera 100 receives the 360-degree video with encoded motion parameters from a server 160, according to an embodiment. As depicted in FIG. 2B, the 360-degree camera 100 communicates the captured 360-degree video to a server 160 for processing and encoding the metadata in the video frame(s).

In an embodiment, the server 160 may implement an image or video processing unit that provides coding of 360-degree videos using region adaptive smoothing and motion parameters estimation for the 360-degree camera 100. The server 160 estimates the motion parameters of the camera 100 (i.e., speed, angular rotation, and/or altitude) across the video frames by analyzing the video frames based on the data obtained from the sensors 110 in conjunction with the capturing of the 360-degree video.

Further, the server 160 may implement a suitable encoder for encoding the motion parameters of the 360-degree camera 100 (i.e., speed, angular rotation, and altitude) as metadata in the video frame(s). The server 160 transmits the 360-degree video with encoded motion parameters to the 360-degree camera 100 as shown in FIG. 2B, or to one or more electronic devices and/or VR devices that are configured for rendering the 360-degree video with reduced motion sickness by applying the one or more suitable motion sickness reduction schemes.

Figure 3:
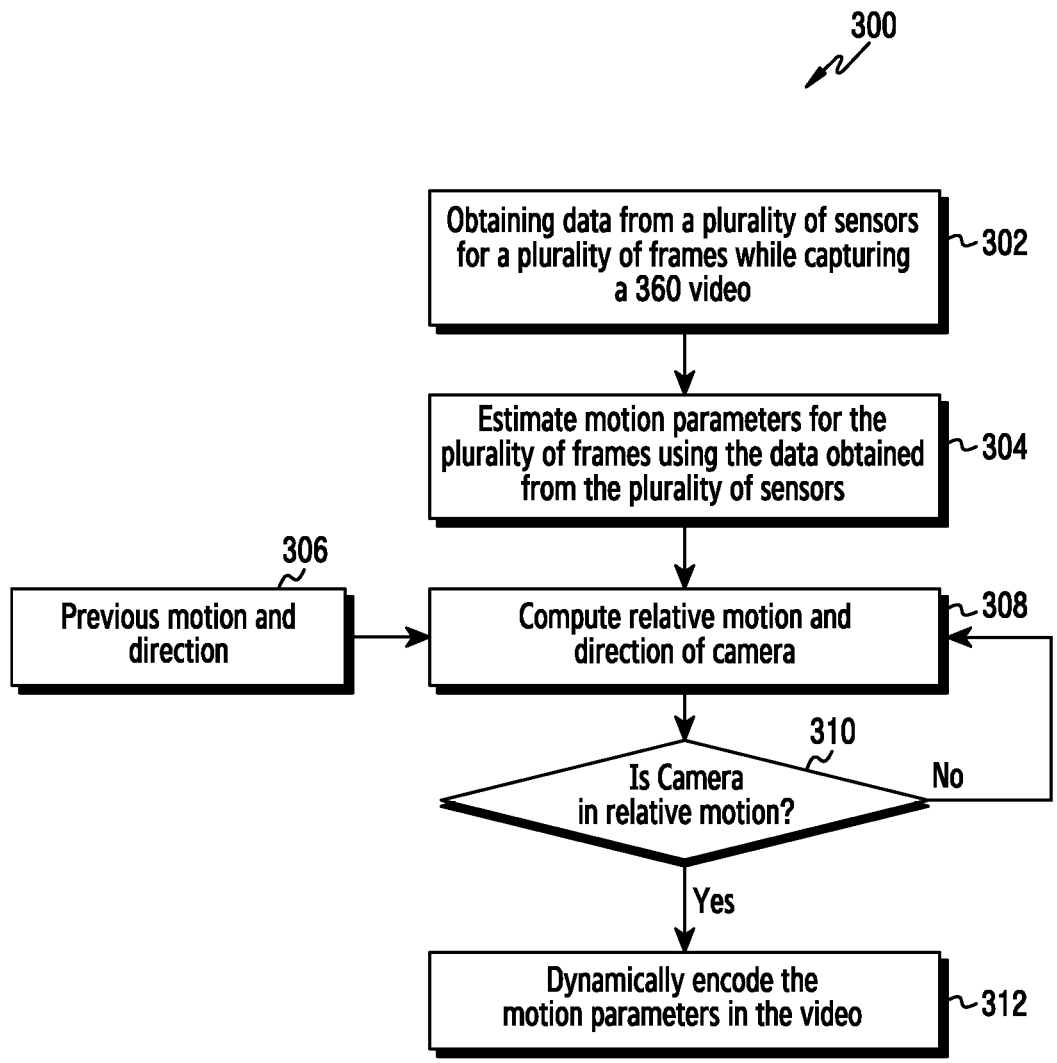
FIG. 3 is a flow chart illustrating a method of capturing the 360-degree video using a 360-degree camera, according to an embodiment.

FIG. 3 is a flow chart 300 illustrating a method of capturing the 360-degree video by using the 360-degree camera 100, according to an embodiment. The various operations of the flow chart 300 are performed by the processor 120 of the 360-degree camera 100.

At operation 302, the method includes obtaining data from the plurality of sensors while capturing the 360-degree video by using the image sensor 140. The data obtained from the sensors includes at least one of a speed of the camera 100 (as obtained from an accelerometer), an angular rotation of the camera 100 (as obtained from a gyroscope), an altitude of the camera 100 (as obtained from a barometric sensor), and/or the like. The data is obtained from the sensors 112 for a plurality of frames, for example from frame i to frame i+N (where N is a natural number). In an embodiment, the sensor data for the frame i to frame I+N sequence is successively (or sequentially) obtained. In an embodiment, the data can be obtained from the sensors 112 for frame i and frame i+N which are not successively acquired (i.e., there is at least one frame in between frame I and frame i+N for which the sensor data is not obtained). In an embodiment, the method includes monitoring sensor data (e.g., GPS data, accelerometer data, altimeter data, gyroscope data of camera, and/or the like) while recording a video using the 360-degree camera 100.

At operation 304, the method includes estimating (or determining, or extracting) the motion parameters for the plurality of frames based on the data obtained from the plurality of sensors. The motion parameters include at least one of the speed, direction, and altitude of the 360-degree camera 100. Using the data obtained from the sensors for the plurality of frames, the motion parameters of the 360-degree camera 100 for the plurality of frames is estimated. For example, at frame i and at frame i+N (or frames i to i+N), it is determined whether the 360-degree camera 100 has moved toward the objects (or an object) in the frame i+N. The movement of the 360-degree camera 100 from frame i and frame i+N is determined by analyzing the frames i and i+N based on the data obtained from the sensors. Further, the speed with which the 360-degree camera 100 has moved across the frames i and i+N can be measured by using data from the accelerometer, and the angular rotation of the 360-degree camera 100 can be obtained by using data obtained from the gyroscope. Thus, the movement (i.e., speed and direction) of the 360-degree camera 100 across the frames i and i+N is obtained by using the data from the sensors 112.

At operation 306, the method includes obtaining the motion of the 360-degree camera 100 for the previous frames together with a direction of the motion. In an embodiment, the motion and the direction of the 360-degree camera 100 for the previous frames are obtained from memory 150. For example, the parameters of the 360-degree camera 100 for frames i–N may be obtained by using the data from the sensors 112. In an embodiment, operation 306 can be omitted (or abbreviated).

At operation 308, the method includes computing (or determining, or analyzing) a relative motion and direction of the 360-degree camera 100. The relative motion and direction of the 360-degree camera 100 is determined for the plurality of frames (e.g., frames i–N to i and frames i to i+N).

At operation 310, the method includes determining whether the 360-degree camera 100 is in relative motion. If it is determined that the 360-degree camera 100 is in relative motion, then at operation 312, the method includes dynamically encoding the motion parameters of the 360-degree camera 100 in the video frame(s). The motion parameters of the 360-degree camera 100 (i.e., speed, angular rotation and altitude) are encoded as metadata in the video frame(s) while capturing the 360-degree video or after capturing the 360-degree video.

If it is determined that the 360-degree camera 100 is not in relative motion, the method loops back to operation 308 to compute the relative motion of the camera across a subsequent set of frames (for example, from frame i+N to frame i+2N).

In an embodiment, when the user is capturing or recording the 360-degree video, the proposed method can be used to track the sensor data of a set of N-frames. In the set of N-frames, a change in velocity and direction of the camera is computed. This data will be encoded in the video as metadata (i.e. speed, direction, altitude) only when camera motion is detected. This information may be used to determine the type of camera motion, and determine an applicable motion sickness reduction technique to overcome sickness that may be induced by the camera motion.

Figure 4:
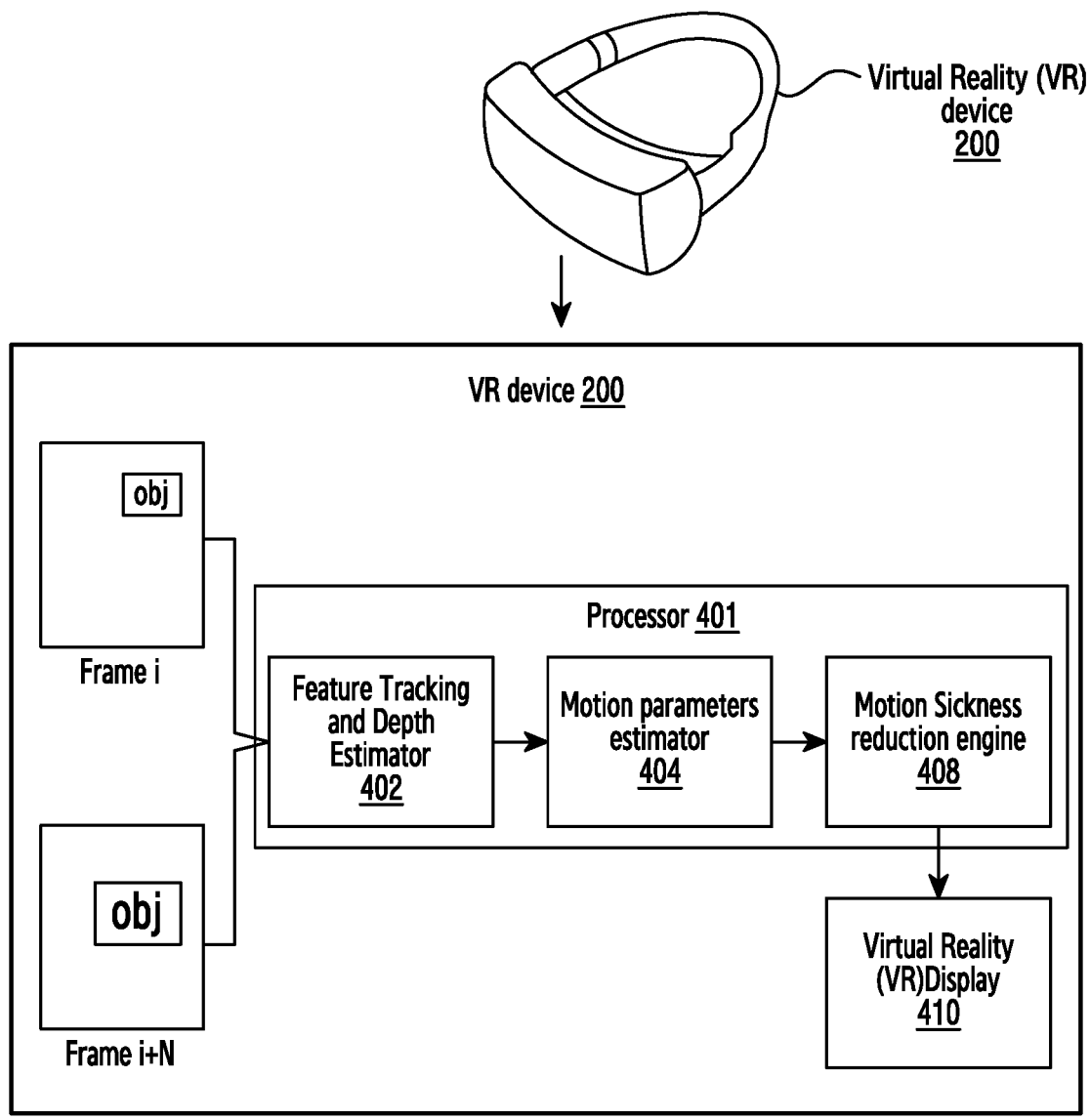
FIG. 4 illustrates various components of a VR device for rendering the 360-degree video on the VR display, according to an embodiment.

FIG. 4 illustrates various components of a VR device 200 which is configured for rendering the 360-degree video on a VR display 410, according to an embodiment. The VR device 200 may include a processor 401 and the VR display 410. The processor 401 may include a feature tracking and depth estimator 402, a motion parameters estimator 404, and a motion sickness reduction engine 408. In an embodiment, at least one of the depth estimator 402, the motion parameters estimator 404, or the motion sickness reduction engine 408 may be a component that is independent from the processor 401 (i.e., a component which is not included in the processor 401).

The feature tracking and depth estimator 402 may be configured to perform feature tracking and depth estimation with respect to the plurality of frames of the 360-degree video. The feature tracking includes the functions of tracking the object(s) between the plurality of sets of multi-focus frames and generating tracked object information that relates to a same object as shown in a plurality of scenes.

Further, the feature tracking and depth estimator 402 may be configured to generate depth for each of the scenes in order to produce a depth map of the scene, by using the set of frames that corresponds to the scene.

The various features (such as objects, edges, contours, etc., using feature detection algorithms) and depth information across a set of video frames of the 360-degree video are extracted during the video playback (or after the video playback).

The motion parameters estimator 404 may be configured to estimate the motion parameters of the 360-degree camera 100 for the plurality of frames. Based on a result of the feature tracking and depth estimation of the plurality of frames, the motion parameters of the 360-degree camera 100 for the plurality of frames are estimated, thereby providing an indication of the movement of the camera across the frames. In an embodiment, the motion parameters estimator 404 may be configured to determine the movement of each feature across the set of video frames, based on the identified features and depth information. Further, the method includes estimating motion parameters of the camera (i.e., a velocity and a direction of the motion of the camera) across the set of video frames based on determined feature movement.

In an embodiment, the motion parameters estimator 404 may be configured to determine a type of motion of the 360-degree camera 100 across the plurality of frames. The type of motion of the camera may include translation (or translation motion, or translational motion) of the camera, rotation of the camera, or a combination of translation and rotation of the camera across the plurality of frames.

The motion sickness reduction engine 408 may be configured to select one or more motion sickness reduction schemes for reducing an impact of the motion of the 360-degree camera 100 according to the determined type of the motion of the 360-degree camera 100. The motion sickness reduction engine 408 may be configured to select from among various schemes, such as, for example, reduced field of view, stroboscopic illumination, and static point of reference, either individually or in combination based on the motion parameters of the camera across the frames according to the determined type of the motion of the 360-degree camera 100.

As a result, the frames are rendered on the VR display 410 with a reduced motion sickness effect.

Figure 5:
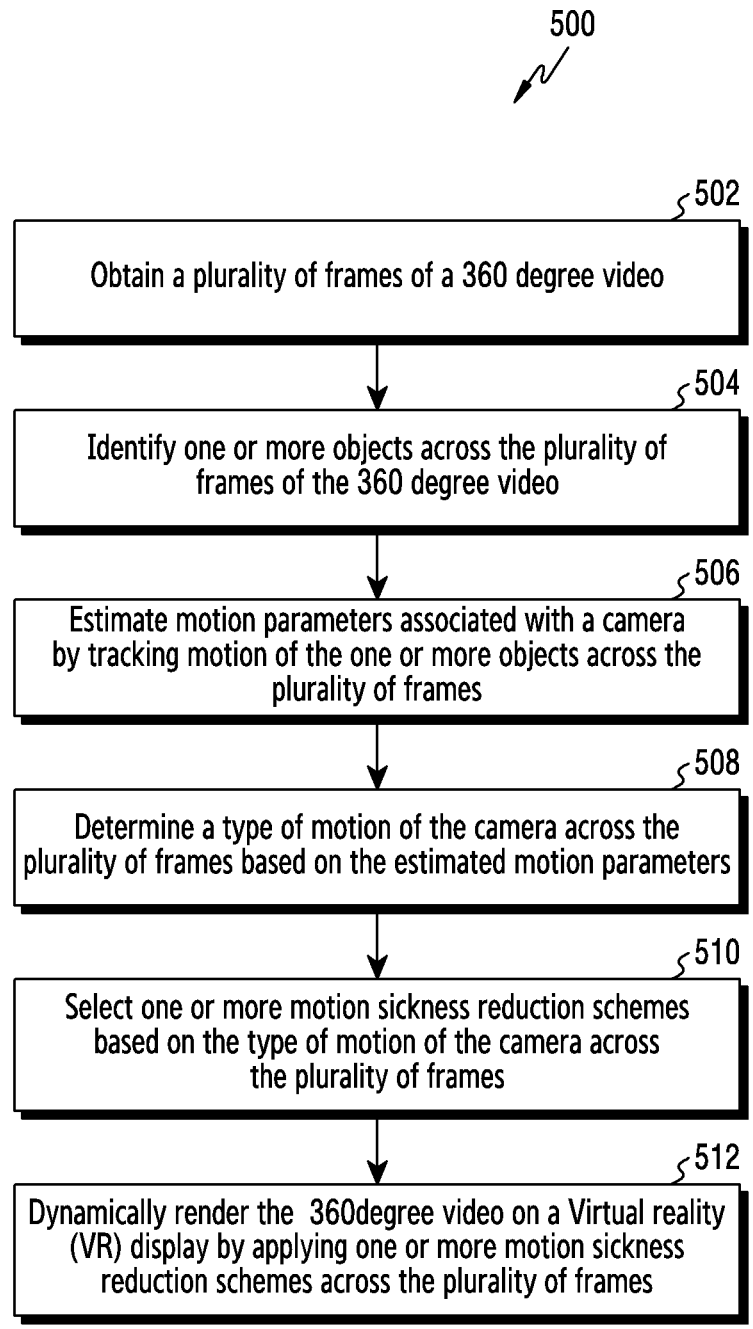
FIG. 5 is a flow chart illustrating a method for rendering the 360-degree video on the VR device, according to an embodiment.

FIG. 5 is a flow chart 500 illustrating a method for rendering a 360-degree video on the VR device 200, according to an embodiment. The various operations of the flow chart 500 are performed by the processor 401 of the VR device 200.

At operation 502, the method includes obtaining a plurality of frames of a 360-degree video. At operation 504, the method includes identifying one or more objects in at least one of the plurality of frames of the 360-degree video.

At operation 506, the method includes estimating motion parameters associated with a camera by tracking (or detecting) a motion of the one or more objects across the plurality of frames. The metadata may be extracted from the video frame(s), or is the metadata may be computed "on the fly" (or in real time) during video playback. The estimated motion parameters are then used to determine at least one of the translation of the camera or rotation of the camera.

In an embodiment, the motion parameters are calculated by tracking the features in a current frame and in an Nth frame (or from the current frame to the Nth frame) from the current frame. At least one of the camera motion and the altitude is used to determine the type of camera motion (i.e., translation and/or rotation).

At operation 508, the method includes determining a type of motion of the camera across the plurality of frames based on the estimated motion parameters. The type of camera motion across the plurality of frames includes at least one of translation, rotation, and a combination of translation and rotation.

At operation 510, the method includes selecting one or more motion sickness reduction schemes, based on the determined type of motion of the 360-degree camera 100 across the plurality of frames. For example, if there is a faster translation of the 360-degree camera 100 (or if an amount (or a change amount) of the translation of the 360-degree camera 100 is equal to or greater than a threshold), the stroboscopic illumination scheme may be selected. In another example, if there is a slower translation of the camera (or if the amount of the translation of the 360-degree camera 100 is less than the threshold), the FOV reduction scheme may be selected. In still another example, when there is a rotation across the plurality of frames, the static point of reference scheme may be selected and applied for reducing the motion sickness. In still another example, when there is a rapid rotation together with translation across the plurality of frames, both of the static point of reference scheme and the dynamic FOV reduction scheme may be selected and applied for reducing the motion sickness. It should be noted that the one or more motion sickness reduction schemes may be applied across all frames of the plurality of frames of the video.

At operation 512, the method includes dynamically rendering the 360-degree video on the VR display 410 by applying the selected one or more motion sickness reduction schemes. While rendering the video, depending on the intensity (or change degree) of the motion and the determined type of the motion, the best motion sickness reduction scheme is applied in order to counter the effects of the camera motion.

In an example, if the camera is undergoing a relatively slow translation, the dynamic FOV reduction scheme may be applied. In the case of faster translation, both of the dynamic FOV reduction scheme and the stroboscopic illumination scheme may be applied.

In another example, if the camera is undergoing a rotation, the static points of reference scheme is useful for reducing the motion sickness effect.

However, the correction schemes are neither exhaustive nor exclusive. Multiple correction schemes can be combined to achieve an improved VR experience. The proposed method and system can be extended to support other motion sickness reduction schemes which may be available at present or in the future.

Figure 6:
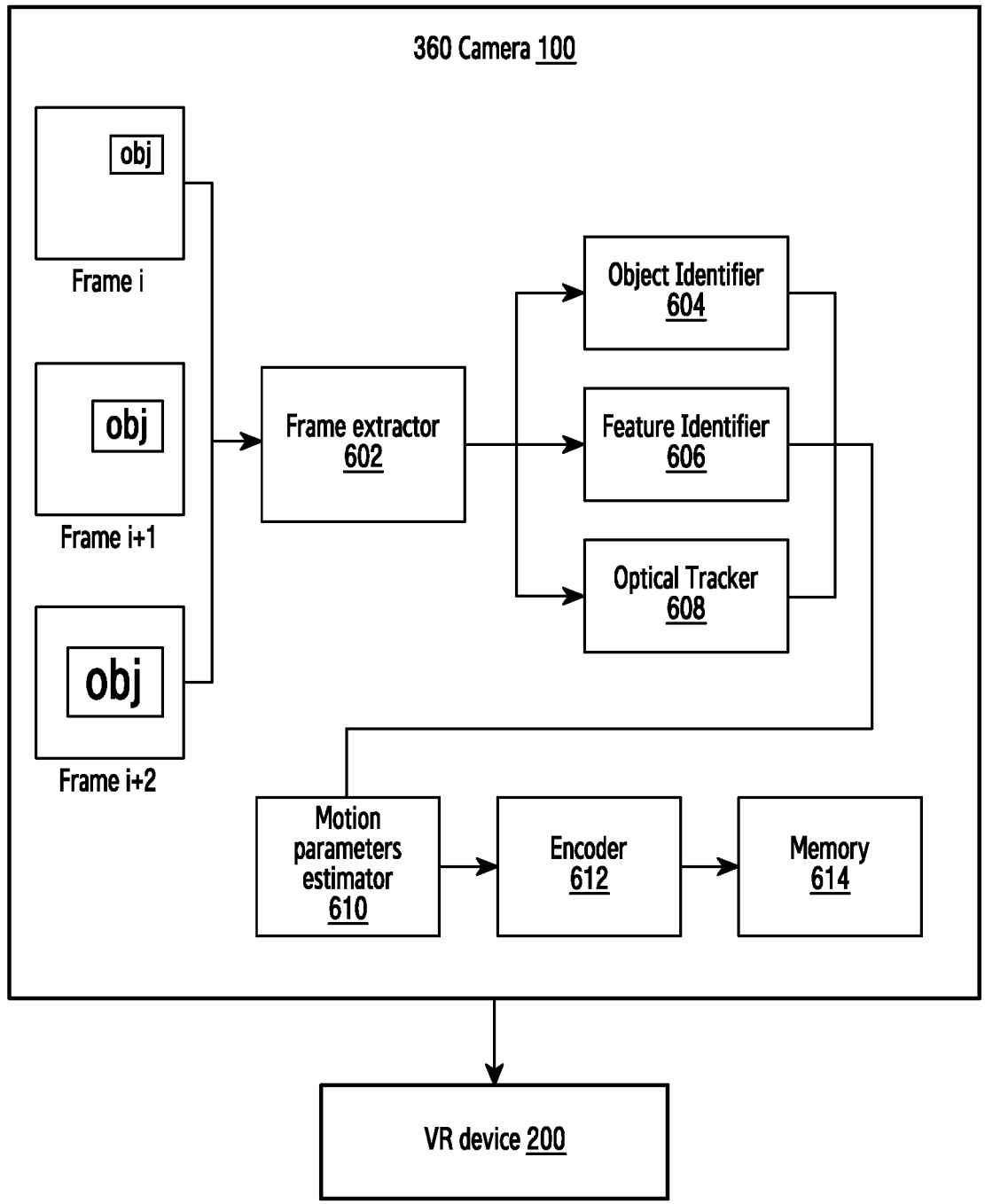
FIG. 6 illustrates various components of a 360-degree camera which are configured for processing the 360-degree video before rendering the 360-degree video, according to an embodiment.

FIG. 6 illustrates various components of a 360-degree camera which are configured for processing the 360-degree video by the 360-degree camera 100 before rendering the 360-degree video, according to an embodiment. The 360-degree camera 100 may include a frame extractor 602, an object identifier 604, a feature identifier 606, an optical tracker 608, a motion parameters estimator 610, an encoder 612, and a memory 614. In an embodiment, at least one of the frame extractor 602, the object identifier 604, the feature identifier 606, the optical tracker 608, the motion parameters estimator 610, or the encoder 612 may be included in the processor 120. In an embodiment, the 360-degree camera 100 of FIG. 6 further comprises at least one of sensors 110, and/or communicator 130 of FIG. 2A.

The frame extractor 602 may be configured to extract the plurality of frames of the 360-degree video, which includes one or more objects.

The object identifier 604 may be configured to identify the one or more objects included in the plurality of frames.

The feature identifier 606 may be configured to identify and/or track the object(s) between the plurality of sets of multi-focus frames and to generate tracked object information that relates to the same object as shown in the plurality of scenes.

The optical tracker 608 may be configured to: extract foreground blobs from frames of a tracking video, and determine locations of the foreground blobs based on their respective positions within the frames of the tracking video.

In an embodiment, the object identifier 604, the feature identifier 606, and the optical tracker 608 may be configured to operate in parallel.

The motion parameters estimator 610 may be configured to estimate the motion parameters of the 360-degree camera 100 for the plurality of frames based on communication(s) received from the object identifier 604, the feature identifier 606 and the optical tracker 608.

The encoder 612 may be configured to encode the motion parameters of the 360-degree camera 100 (i.e., speed, angular rotation and altitude) as metadata in the video frame(s). The video frames with encoded parameters of the 360-degree camera 100 are stored in the memory 614.

The various operations involved in processing the 360-degree video in the video processing engine include the following:

1. Identifying features in the scene by using feature detection techniques.
2. Tracking the identified features in N successive frames.
3. Computing an average speed of the identified features.
4. Based on the computed average feature speed and camera calibration parameters, detecting a camera motion and storing motion parameters that relate to the detected camera motion.
5. Repeating steps 1, 2, 3, and 4 for multiple view ports until 360 degrees of the video is covered.

In various embodiments, other tracking techniques (such as, for example, an optical flow technique) and machine learning based schemes for object identification (for example, identifying a static object, e.g., a tree) may also be used to improve the estimation of camera velocity.

As a result, the video frames with encoded parameters of the 360-degree camera 100 may be rendered via the VR device 200 with a reduced motion sickness effect.

Figure 7:
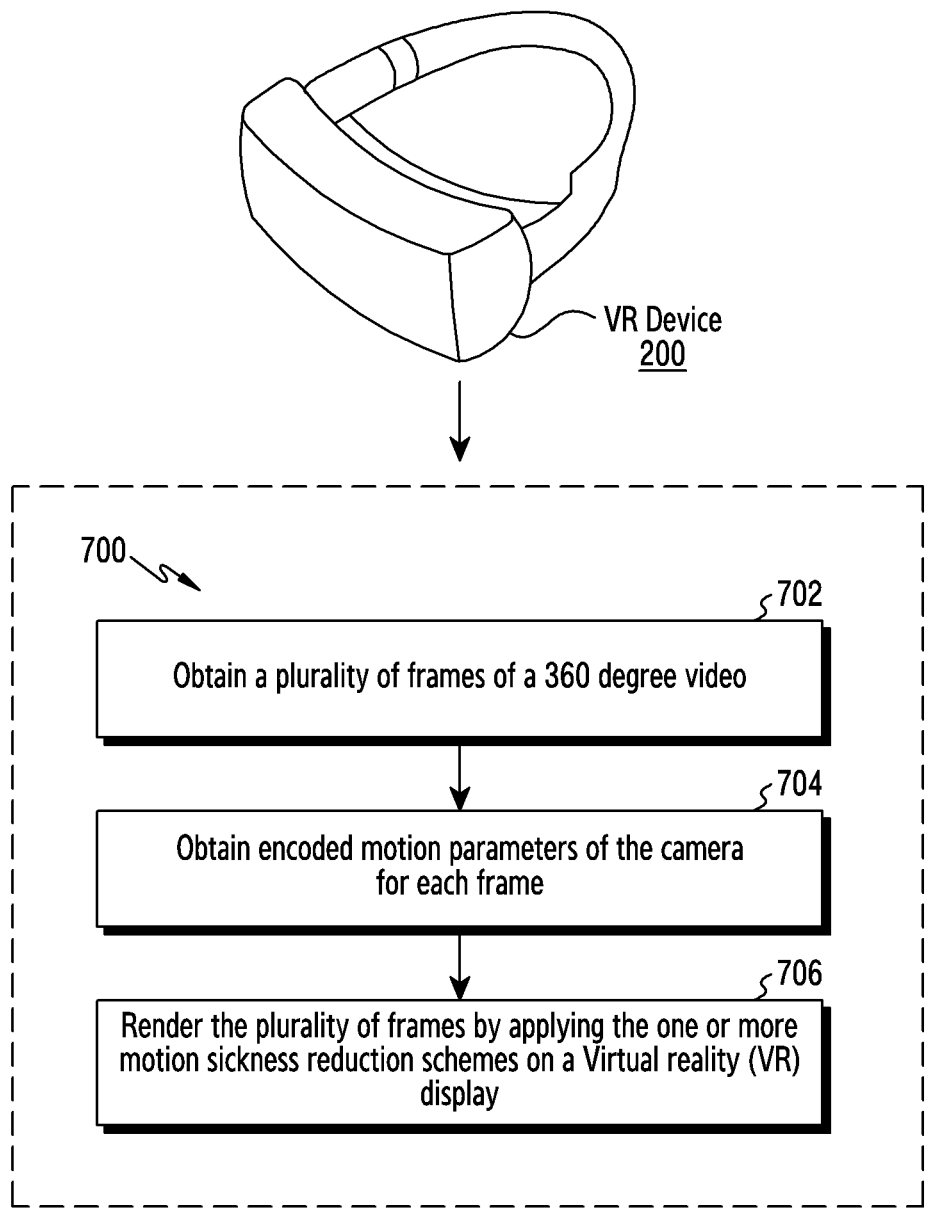
FIG. 7 illustrates various operations for rendering the 360-degree video, according to an embodiment.

FIG. 7 is a flow chart 700 illustrating various operations for rendering the 360-degree video, according to an embodiment. The various operations of the flow chart 700 are performed by the processor 401.

At operation 702, the method includes obtaining a plurality of frames of the 360-degree video.

At operation 704, the method includes obtaining the encoded motion parameters of the 360-degree camera 100 for each frame.

At operation 706, the method includes rendering each frame by reducing an impact of motion parameters on the VR display. The video frame(s) are rendered by applying one or more suitable motion sickness reduction schemes. The one or more motion sickness reduction schemes are applied over N frames having the encoded metadata for reducing the motion sickness while rendering the 360 video on the VR display 410.

Figure 8:
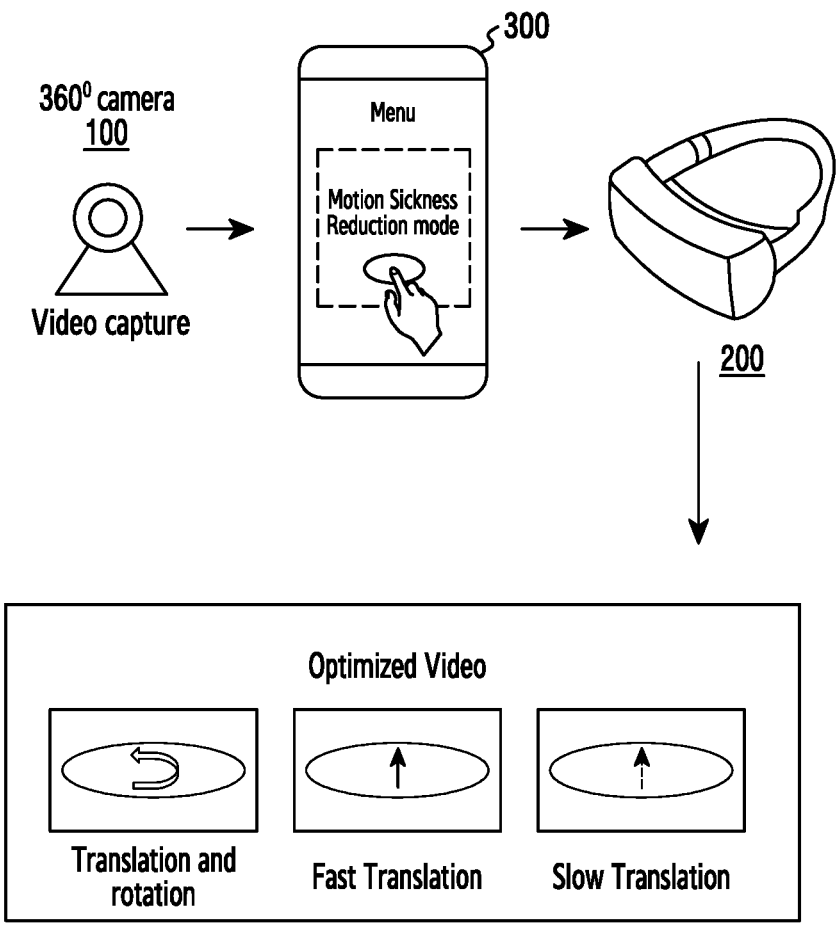
FIG. 8 is an example illustration in which the 360-degree video is rendered with reduced motion sickness on the VR device, according to an embodiment.

FIG. 8 is an example illustration in which the 360-degree video is rendered with reduced motion sickness on the VR device 200, according to an embodiment.

In an embodiment, a 360-degree video is encoded to video formats such as MP4 and WebM. However, in order to add information about the 360-degree video, standard container formats such as Spherical Video V2 RFC are in the process of standardization.

By implementing the proposed method, a user may select a motion sickness reduction mode on the electronic device 300, and as a result, the 360-degree video is rendered with a reduced motion sickness effect on the VR device 200.

The processor 401 applies one or more motion sickness reduction techniques to render an optimized video with a reduced motion sickness effect on the VR display as shown in FIG. 8.

The embodiments disclosed herein may be implemented via at least one software program running on at least one hardware device and performing network management functions to control the elements. The software program may be stored, for example, on a non-transitory computer-readable storage medium.

The foregoing description of the specific embodiments will so fully reveal the general nature of the embodiments herein that persons having ordinary skill in the art can, by applying current knowledge, readily modify and/or adapt for various applications such specific embodiments without departing from the present inventive concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while various embodiments herein have been described, persons having ordinary skill in the art will recognize that the embodiments herein can be practiced with modification within the spirit and scope of the embodiments as described herein.

What is claimed is:

1. A method for reducing a motion sickness effect associated with a rendering of a video on a virtual reality device, the method comprising:
    obtaining data from a plurality of sensors for a plurality of frames while capturing the video:
    identifying features in at least one frame among the plurality of frames by using feature detection techniques;
    tracking the identified features in at least two successive frames among the plurality of frames:
    obtaining an average speed of the identified features;
    detecting, based on the obtained average speed, a motion of a camera;
    storing at least one motion parameter related to the detected motion of the camera;
    identifying, based on the stored at least one motion parameter, a type of the motion of the camera;
    determining, based on the identified type of the motion of the camera and a result of comparing a velocity of the camera and a predetermined threshold, at least one motion sickness reduction scheme to be applied to the video; and
    dynamically rendering the video to the virtual reality device by applying the determined motion sickness scheme to the video,
    wherein the determining at least one motion sickness reduction scheme comprises:
    selecting a stroboscopic illumination scheme in a case where the identified type of the motion indicates a fast translation with the velocity equal to or greater than the predetermined threshold; and
    selecting a field of view (FOV) reduction scheme in a case where the identified type of the motion indicates a slow translation with the velocity less than the predetermined threshold.

2. The method of claim 1, wherein the at least one motion parameter includes at least one of position coordinates of the camera, the velocity of the camera, an acceleration of the camera, an altitude of the camera, an angle of rotation of the camera, or a direction of the camera.

3. The method of claim 1, wherein the storing the at least one motion parameter comprises storing the at least one motion parameter that is included as metadata in the at least one frame among the plurality of frames.

4. The method of claim 3, wherein the at least one motion parameter is generated based on information related to the motion of the camera which is received from a sensor included in the camera.

5. The method of claim 3, wherein the at least one motion parameter is generated based on information related to at least one object included in the at least one frame among the plurality of frames.

6. The method of claim 1, wherein the camera is included in the virtual reality device.

7. A virtual reality device comprising:
    a display; and
    at least one processor is configured to:
    obtain, data from a plurality of sensors for a plurality of frames while capturing a video;
    identify, features in at least one frame among the plurality of frames by using feature detection techniques;
    track, the identified features in at least two successive frames among the plurality of frames:
    obtain, an average speed of the identified features;
    detect, based on the obtained average speed, a motion of a camera;
    store, at least one motion parameter related to the detected motion of the camera;
    identify, based on the extracted at least one motion parameter, a type of the motion of the camera;
    determine, based on the identified type of the motion of the camera and a result of comparing a velocity of the camera and a predetermined threshold, at least one motion sickness reduction scheme to be applied to the video; and
    dynamically render the video to the virtual reality device by applying the determined motion sickness scheme to the video,
    wherein, in order to determine the at least one motion sickness reduction scheme, the processor is configured to:
    select a stroboscopic illumination scheme; in a case where the identified type of the motion indicates a fast translation with the velocity equal to or greater than the predetermined threshold, and
    select a field of view (FOV) reduction scheme in a case where the identified type of the motion indicates a slow translation with the velocity less than the predetermined threshold.

8. The virtual reality device of claim 7, wherein the at least one motion parameter includes at least one of position coordinates of the camera, the velocity of the camera, an acceleration of the camera, an altitude of the camera, an angle of rotation of the camera, or a direction of the camera.

9. The virtual reality device of claim 7, wherein, in order to store the at least one motion parameter, the at least one processor is configured to store the at least one motion parameter that is included as metadata in the at least one frame among the plurality of frames.

10. The virtual reality device of claim 9, wherein the at least one motion parameter is generated based on information related to the motion of the camera which is received from a sensor included in the camera.

11. The virtual reality device of claim 9, wherein the at least one motion parameter is generated based on information related to at least one object included in the at least one frame among the plurality of frames.

* * * * *